Feb. 17, 1970 J. T. DEWAN 3,496,360
CRYOGENICALLY COOLED RADIOACTIVITY BOREHOLE
LOGGING TECHNIQUE
Filed June 22, 1967
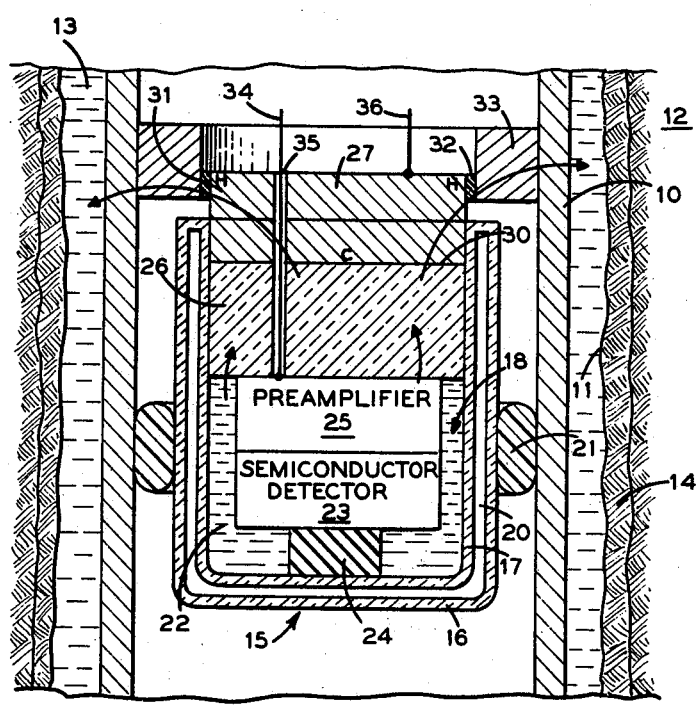
INVENTOR.
John T. Dewan
BY
*John P. Sinnott*
ATTORNEY

United States Patent Office 3,496,360
Patented Feb. 17, 1970

3,496,360
CRYOGENICALLY COOLED RADIOACTIVITY BOREHOLE LOGGING TECHNIQUE
John T. Dewan, Houston, Tex., assignor to Schlumberger Technology Corporation, New York, N.Y., a corporation of Texas
Filed June 22, 1967, Ser. No. 648,165
Int. Cl. G01t 1/16
U.S. Cl. 250—83.3         11 Claims

ABSTRACT OF THE DISCLOSURE

An illustrative embodiment of the invention shows a semiconductor radiation detector and the associated circuit in a borehole logging tool. The tool is equipped with a liquefied gas-filled cryostat in which are immersed the detector and at least a portion of the detector signal preamplifier. A thermoelectric cooling module absorbs heat from the cryostat and discharges this heat through the tool housing to the borehole environment in order to stabilize the detector and preamplifier temperatures during long logging runs.

BACKGROUND OF THE INVENTION

Field of the invention

This invention relates to borehole logging equipment and, more particularly, to temperature stabilization for a downhole semiconductor radiation detector and the preamplifier associated therewith, and the like.

Description of the prior art

Semiconductor radiation detectors have been proposed for use in borehole logging tools because of the relatively superior ability of these devices to distinguish between the different energies of incident nuclear radiations. The marked superiority of these devices can be appreciated better by comparing the "energy resolution" of semiconductor detectors with the resolution of other energy-sensitive radiation detectors. Thus, for example, semiconductor detector energy resolutions of 0.1 percent are now common, in contrast to scintillation counter energy resolutions of about 7 percent.

Energy resolution is especially important in borehole logging techniques that rely on an interpretation of the abundance or intensity of gamma rays as a function of the energies of these rays. An example of a logging technique of this sort is described in more complete detail in U.S. patent application Ser. No. 219,970, filed by Jay Tittman on Aug. 28, 1962, for "Chlorine Logging Methods," now U.S. Patent No. 3,413,471, granted Nov. 26, 1968, and assigned to the assignee of the invention described herein.

Basically, the Tittman patent application describes a technique for contrasting the neutron-induced gamma ray energy spectrum of hydrogen with that of chlorine to identify the presence of chlorine in the formation under investigation. The purity of the desired spectrum, however, is degraded by gamma rays from elements other than hydrogen and chlorine, the attenuation of gamma rays of interest within the formation, and other influences. Consequently, the energy resolving capabilities of semiconductor detectors, which produce sharply defined spectra, ought to provide a much better tool for distinguishing a desired spectrum in the presence of extremely bad background conditions.

Semiconductor detectors typically comprise a crystalline structure of silicon or germanium. The crystal ordinarily is adulterated or "doped" with lithium in a way that enables one portion of the crystalline structure to contain slightly more lithium than the other portion. The interface between these two portions forms a "junction" between the two different lithium concentrations. A semiconductor device of this sort is a diode, or a device that permits electrons to flow only in one direction. If a "reverse" bias is applied to the diode, that is, a voltage polarity is applied to the detector that prevents electrons from flowing through the junction, those electrons that do not form a part of the crystal structure are swept out of the junction. This electron depletion zone often is several millimeters deep.

Nuclear radiation, such as gamma rays that interact with the electrons in the atomic structure of the depletion zone, free some of these electrons from this structure and "forward" bias the detector. The forward biased diode allows electrons to flow through the junction and produce charge pulses in the detector output terminals that are generally proportional to the energy deposited in the depletion zone by each respective gamma ray.

Because heat also forward biases these devices, it is customary to operate them at Dry Ice or liquefied nitrogen temperatures in order to reduce thermal noise to a minimum. In borehole logging applications, however, the downhole tool containing the detector frequently is exposed to temperatures in excess of 200° C. for five hours or more. Naturally, the cooling capacity of an initial charge of Dry Ice or liquefied gas is dissipated quickly in this sort of environment, and some more adequate technique is needed to cool these devices in a logging tool.

The logging industry, moreover, generally has failed to grasp a further and more subtle obstacle that prevents semiconductor detectors from finding a truly useful application in downhole tools. The radiation effects noted above in connection with semiconductor detector operation are actually quite small and produce charge pulses that are measured in terms of a few tens or hundreds of electrons in each pulse. Naturally, these detector signals must be amplified in order to provide a signal of adequate strength for subsequent recording of computation. Usually the amplification is accomplished in at least two steps. A charge-sensitive preamplifier ordinarily is coupled to the detector output and a signal amplifier is connected to the preamplifier output at some other point in the circuit. This specific combination is not entirely suitable for semiconductor detector applications because the energy resolution of the entire system is limited by the noise characteristics of the preamplifier, and not by the inherent capabilities of the detector.

This problem has been overcome in the laboratory by using one or more field-effect transistors (FET) in the initial stages of preamplification. Alternatively, varactor diodes have been used in a parametric amplifier configuration for charge-sensitive preamplification. In both of these preamplifiers, it has been found necessary to cool the FET's to about −130° C. and the parametric amplifier to the temperature of liquid nitrogen for the best energy resolution. A borehole logging tool proposal has been advanced to provide a semiconductor detector, an FET preamplifier and a coolant for logging boreholes. For very large semiconductor detectors of the type most desirable for logging purposes, however, the FET preamplifier still imposes the ultimate energy resolution limitation on the entire detector system.

Thus, it is an object of the invention to provide a stable operating temperature for a semiconductor radiation detector in a well logging tool.

It is still another object of the invention to use an amplifier characterized by thermal noise-free components to enhance the energy resolution of a semiconductor detector in a borehole logging tool.

It is still another object of the invention to improve borehole logging tool operation by providing a coolant for at least a portion of a varactor diode preamplifier and a semiconductor detector in the tool.

It is still another object of the invention to improve semiconductor detector circuit response in a borehole logging tool by cooling only a portion of the charge-sensitive preamplifier associated therewith.

It is a further object of the invention to provide a means for continuously removing heat from the coolant for a semiconductor detector and at least a portion of the preamplifier associated therewith.

SUMMARY

In accordance with the invention, the semiconductor radiation detector and at least a portion of the associated charge-sensitive preamplifier are immersed in a low temperature bath in a borehole well logging tool cryostat from which heat is removed continuously and efficiently. By continuously dissipating heat from the cryostat, the temperature sensitivity of the detector and the preamplifier is alleviated and enables the detector to be used in long logging runs. Cooling only the FET's in the preamplifier, moreover, increases the energy resolution of the system and reduces the thermal burden on the heat dissipation system. Alternatively, a preamplifier that uses essentially thermal noise-free components, for example, a pair of varactor diodes in a parametric amplifier configuration, can be immersed in the logging tool cryostat and provide a satisfactory signal, especially with the large volume detectors needed for borehole logging.

More particularly, a thermoelectric cooling module that pumps heat from a cold junction to a warmer junction in response to an applied electrical current, is placed in thermal communication with a semiconductor detector and preamplifier in a cryostat. The compact nature and efficient non-mechanical operation of the thermoelectric cooling module enables the detector and at least all of the thermally critical preamplifier components to be encased within a cryostat in a well logging tool of reasonable diameter. The continuous operation of the module, moreover, permits the tool to log deeper boreholes for longer periods of time than those which have been proposed heretofore.

Because of individual differences in the thermal and electrical characteristics of the semiconductor detector and the associated preamplifier, it may be advisable to provide separate cryostats for each of these components in order to optimize the energy resolution of the system. For example, the preamplifier may be immersed in a cryostat filled with liquified nitrogen, while the semiconductor detector can be operated in another cryostat at about the temperature of Dry Ice.

For a better understanding of the present invention, together with other and further objects thereof, reference is had to the following description taken in connection with the accompanying drawings, the scope of the invention being pointed out in the appended claims.

BRIEF DESCRIPTION OF THE DRAWING

A schematic diagram in full section of a portion of a borehole logging tool in accordance with one embodiment of the invention is shown in the sole figure of the drawing.

DESCRIPTION OF THE PREFERRED EMBODIMENTS

An illustrative embodiment of a practical apparatus embracing the principles of the invention is shown in the drawing.

A pressure- and fluidtight housing 10 is suspended in the borehole 11 by an armored cable (not shown) which may contain a group of insulated conductors for transmitting power to the tool and signals to the earth's surface in order to identify properties of a formation 12. A winch (also not shown) is located at the surface of the earth to lower and raise the housing 10 within the borehole 11.

The borehole 11 may be cased with steel pipe and concrete or uncased, as shown, and filled with air, or an oil-base or water-base drilling fluid 13, also as shown. The borehole 11, moreover, is lined with a mudcake 14 which usually forms in uncased boreholes when liquids in the drilling fluid 13 invade or seep into the earth formations 12 and deposit a residue of solid matter on the borehole walls.

Because the earth's temperature increases with borehole depth, many boreholes traversing formations of interest have ambient temperatures substantially in excess of 200° C.

The housing 10 encloses a Dewar flask 15 that has an outer wall 16 and an inner wall 17 of silvered glass, or the like. The outer and inner walls 16 and 17 are separated by a vacuum or an evacuated annulus 20. The silvering tends to protect the interior 18 of the flask 15 from radiant heat transfer, while the vacuum 20 between the walls 16 and 17 retards heat conduction from the borehole 11 to the flask interior 18. This structural arrangement provides some thermal isolation for the flask interior 18 from the borehole environment.

An annular support and shock absorbing pad 21 formed of rubber or the like is interposed between the outer wall 16 of the Dewar flask 15 and the inner surface of the housing 10. The pad 21 protects the delicate flask and the encased electrical apparatus from damage during handling and operation.

The flask interior 18 contains a low temperature coolant 22, such as liquified nitrogen. A semiconductor radiation detector 23, which may be one of the types hereinbefore described, is encased in a vacuum chamber and immersed in the coolant 22. The detector 23 is supported within the flask 15 by a block 24 of electrically and thermally insulating material, such as a foam plastic.

In accordance with the invention, the detector 23 is coupled electrically to a charge pulse preamplifier 25. The preamplifier 25 may comprise almost thermally noise-free components encased in a vacuum chamber housing, as in the varactor diode-parametric amplifier configuration described in more complete detail in "Improved Detectors and Circuits Spur Nuclear-Particle Research," Nucleonics, vol. 24, No. 5, May 1966, page 44 et seq. Preamplifiers of this sort have been found, according to the invention, to be especially valuable for borehole logging tools. An almost complete absence of thermal noise in the varactor diodes eliminates the energy resolution limitation imposed by prior art preamplifiers on the signal output from the large-volume semiconductor detectors needed for accurate logging.

Typically, to detect a sufficient number of nuclear radiations so that a statistically reliable analysis of the formation 12 can be undertaken, the depletion zone of the detector 23 ought to be as great as possible. Silicon and germanium detector diodes are now available that have sensitive volumes in excess of 10 cm.$^3$. Diodes of this sort, however, have capacitances greater than 10 pf. (picofarads). Such relatively high capacitances adversely affect preamplifiers noise characteristics and thereby degrade the energy resolution of the entire system. The almost noiseless feature of the varactor diode offset the inherently high capacitances of these devices, and produce much better logging tool performance than that which was possible with prior art preamplifiers.

As an alternative embodiment of the invention, the charge-pulse preamplifier circuit 25 may comprise one or more amplifier stages using FET's. In this case, just the FET circuits are placed in the vacuum chamber and immersed in the coolant 22. The varactor diode preamplifier 25, or the field effect transistor portion of the preamplifier, is coupled to the detector 23 through appropriate electrical connections (not shown) to amplify the signals from the detector 23. The preamplifier vacuum chamber housing, moreover, provides a path for the removal of heat from the flask interior 18.

A plug 26, which may be a sapphire rod to provide limited thermal conduction from the flask interior 18, and satisfactory electrical insulation for the detector 23 and the preamplifier 25, is lodged snugly in the open neck of the flask 15.

The detector 23 and the preamplifier 25 generate a limited amount of heat, while the flask 15 fails to provide perfect thermal insulation from the borehole environment. To overcome this heat gain within the flask interior 18, and to stabilize the detector and preamplifier temperature, a thermoelectric cooling module 27 is provided in accordance with a further aspect of the invention to absorb heat from a cold junction 30, as indicated by the letter "C," at the interface between the module 27 and the sapphire plug 26. The heat flowing from the flask interior toward the plug 26 in the direction shown generally by the arrows is "pumped" by the module 27 to a warmer junction 31, as indicated by the letter "H," so that the heat is dissipated ultimately in the borehole environment.

Illustratively, the thermoelectric cooling module 27 comprises an array of bismuth telluride devices. These devices respond to an appropriately applied current by drawing heat from a body at low temperature and discharging this heat to another body at a higher temperature. The Dewar flask 15, coolant 22, plug 26 and thermoelectric cooling module 27, moreover, comprise a cryostat for maintaining a substantially constant low temperature within the flask interior 18.

A thin film 32 of electrically insulating and thermally conducting material, aluminum oxide ($Al_2O_3$), for example, electrically insulates the hot junction 31 from a circumscribing ring 33 of thermally conductive material, such as copper or the like. The ring 33 is interposed between the insulating film 32 and the inner surface of the tool housing 10 to provide a path for the heat to flow from the module 27 through the ring 33 and the housing 10 into the borehole environment as indicated by the arrows in the drawing.

Power and signal transmission paths are provided for the detector 23 and the preamplifier 25 through electrical conductor 34 (not individually illustrated). Schematically shown, the conductors 34 traverse a bore 35 formed in the thermoelectric cooling module 27 and the plug 26. In a similar manner, power for the thermoelectric cooler 27 is provided by a group of conductors 36 (also not individually shown). The preamplified radiation detector signals transmitted through some of the conductors 34 are processed by further amplification and information processing circuits (not shown) within the housing 10. These processed signals are sent to the earth's surface through a cable (also not shown) for recording or computation in order to determine the nature and characteristics of the earth formation 12.

In operation, the flask interior 18 is filled with a fresh charge of the coolant 22 on the earth's surface through an appropriate inlet (not shown) which also can provide a pressure relief valve for the discharge of any gas "boiling off" from the coolant.

As hereinbefore mentioned, the preamplifier 25, or a portion thereof, can be accommodate in a separate cryostat to satisfy temperature requirements that are distinct from the detector requirements. Other suitable heat transfer techniques can be used in connection with present invention as, for example, the logging tool cooling apparatus described in more complete detail in James K. Hallenburg, U.S. patent application Ser. No. 630,664, for "Electrical Apparatus," filed Apr. 13, 1967. To improve the response of the detector 23, moreover, the housing 10 may be biased against the wall of the borehole 11 to eliminate at least in part the influence of the mudcake 14 and the intervening drilling fluid 13. Radiation attenuation caused by the presence of iron and other elements in the housing 10 also can be overcome by inserting in the housing adjacent to the detector 23 a "window" that does not absorb the desired radiations.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A borehole logging tool comprising a housing, a semiconductor radiation detector within the housing, an amplifier within said housing having at least one temperature-sensitive component therein coupled to said semiconductor detector, and means for keeping said semiconductor detector and substantially only said temperature-sensitive amplifier component at liquified gas temperatures.

2. A borehole logging tool according to claim 1 wherein said amplifier comprises a charge-sensitive device.

3. A borehole logging tool according to claim 1 wherein said temperature-sensitive amplifier component comprises at least one field effect transistor.

4. A radioactivity borehole logging tool comprising a housing, at least one cryostat within said housing, a liquefied gas within said cryostat, a semi-conductor detector within said cryostat, at least a portion of an amplifier cooled to said liquefied gas temperature, said portion having an essentially thermal-noiseless component therein, and thermally conductive means associated with said cryostat and said housing for absorbing heat from said cryostat and discharging said heat to said housing.

5. A tool according to claim 4 wherein thermally conductive means comprises an electrically insulating plug and a thermoelectric cooling module for transferring said heat from said cryostat to said housing.

6. A tool according to claim 4 wherein said essentially noiseless component comprises at least one varactor.

7. A tool according to claim 6 wherein said amplifier comprises a parametric amplifier.

8. A borehole logging tool according to claim 7 comprising a low temperature liquified gas bath for said detector and said amplifier.

9. A borehole logging tool comprising a housing, a semiconductor radiation detector within the housing, an amplifier within said housing having at least one thermal noise-free component therein electrically coupled to said semiconductor detector, and means for keeping said semiconductor detector and at least said thermal noise-free component at liquefied gas temperatures.

10. A borehole logging tool according to claim 9 wherein said thermal noise-free component comprises at least one varactor diode.

11. A borehole logging tool according to claim 10 wherein said amplifier comprises a parametric amplifier.

References Cited

UNITED STATES PATENTS

| | | | |
|---|---|---|---|
| 2,760,078 | 8/1956 | Youmans | 250—83.3 |
| 2,991,366 | 7/1961 | Salzberg | 250—83.3 |
| 3,049,620 | 8/1962 | George et al. | 250—83.6 X |
| 3,219,825 | 11/1965 | Graham | 250—83.3 |
| 3,356,846 | 12/1967 | Rupert et al. | 250—83 |
| 3,265,893 | 8/1966 | Rabson et al. | 250—71.5 |

RALPH G. NILSON, Primary Examiner

D. L. WILLIS, Assistant Examiner

U.S. Cl. X.R.

250—71.5